United States Patent [19]

Breslau

[11] 4,435,289

[45] Mar. 6, 1984

[54] SERIES ULTRAFILTRATION WITH PRESSURIZED PERMEATE

[75] Inventor: Barry R. Breslau, Action, Mass.

[73] Assignee: Romicon, Inc., Woburn, Mass.

[21] Appl. No.: 333,743

[22] Filed: Dec. 23, 1981

[51] Int. Cl.³ .................... B01D 31/00; B01D 13/00
[52] U.S. Cl. ................................ 210/637; 210/433.2
[58] Field of Search ............... 210/638, 433.2, 637, 210/333.01, 411

[56] References Cited

U.S. PATENT DOCUMENTS

| | | | |
|---|---|---|---|
| 3,536,612 | 10/1970 | Kopecek et al. | 210/637 X |
| 3,776,842 | 12/1973 | Grimme, Jr. | 210/638 |
| 3,839,201 | 10/1974 | Miller | 210/637 |
| 4,002,567 | 1/1977 | Konno et al. | 210/433.2 X |
| 4,191,182 | 3/1980 | Popovich et al. | 210/433.2 X |

Primary Examiner—Frank A. Spear, Jr.
Attorney, Agent, or Firm—Fidelman, Wolffe & Waldron

[57] ABSTRACT

Process and apparatus for providing separation of solutes, colloidal particles or suspended matter by ultrafiltration wherein increased cost efficiency and reduced energy requirements are realized by series flow configuration, utilizing increased operating pressures, and back pressurization of permeate.

14 Claims, 5 Drawing Figures

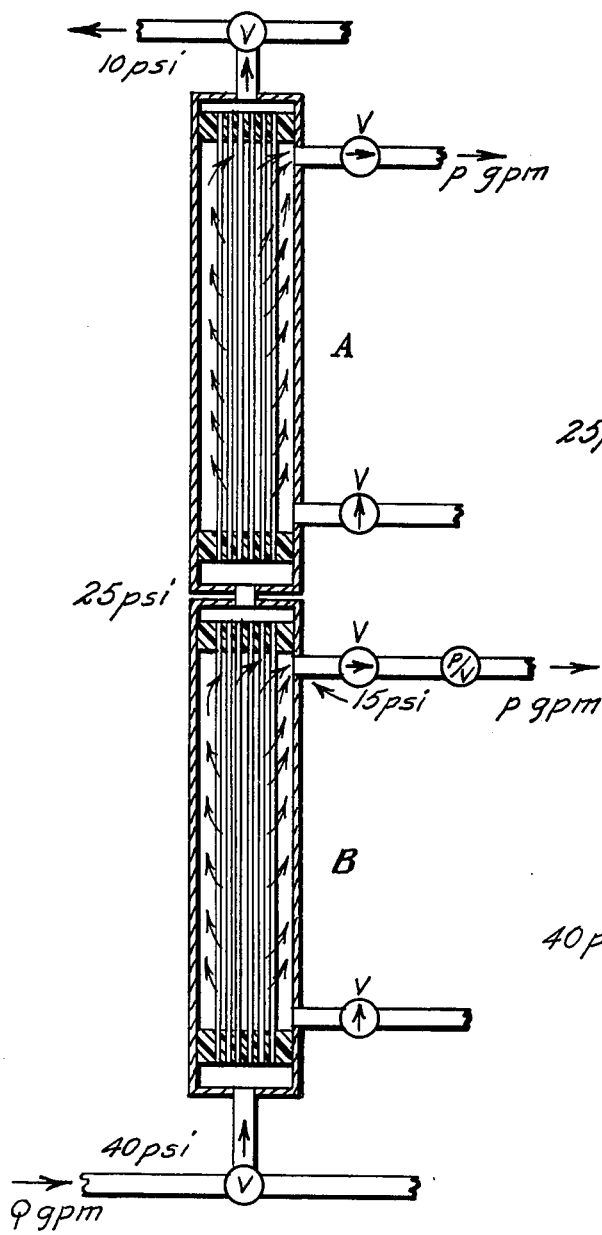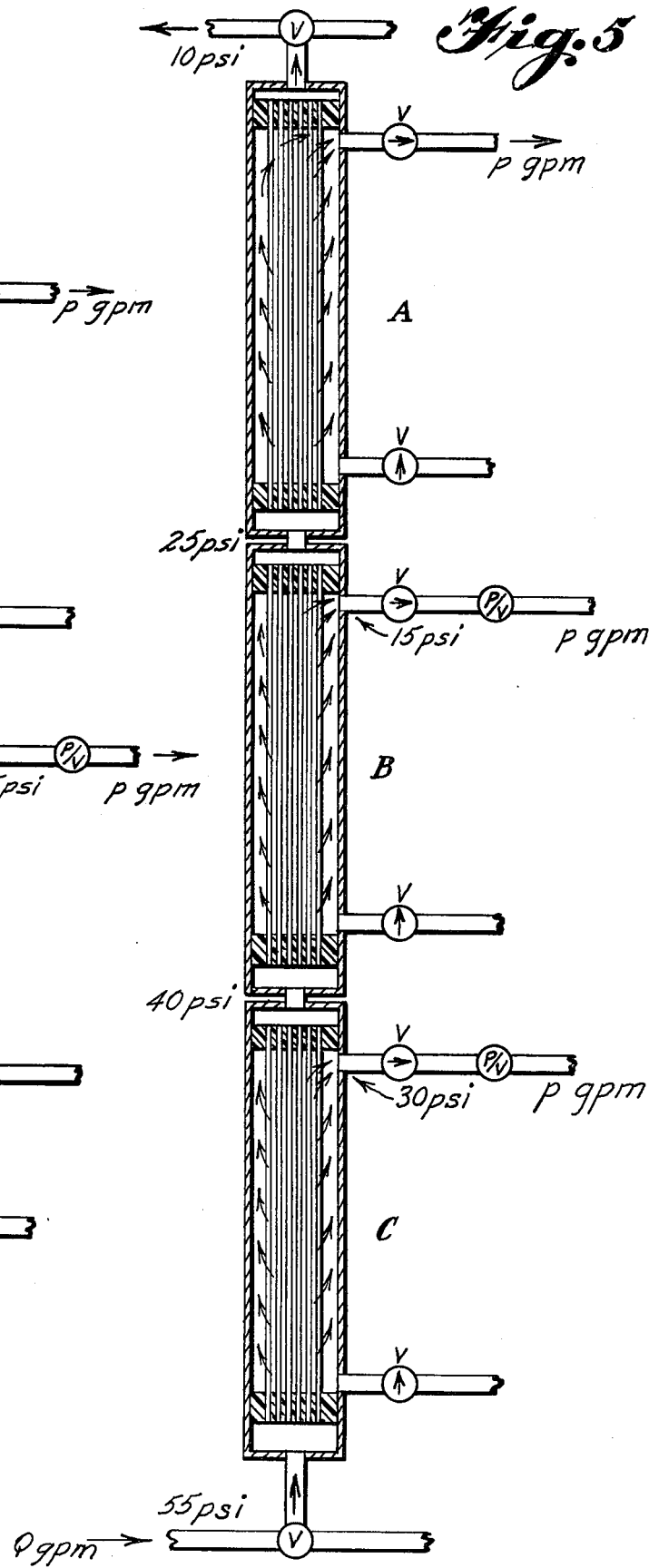

SERIES ULTRAFILTRATION WITH PRESSURIZED PERMEATE

This invention relates to a process for separation of solutes, colloidal particles or suspended matter from solutions or suspensions containing same. More particularly, this invention relates to pressure activated ultrafiltration separation of such solutions or suspensions into various fractions by contact thereof with synthetic semi-permeable membranes.

BACKGROUND OF THE INVENTION

Ultrafiltration is a process of separation of solutions or suspensions wherein a solution or suspension which contains a solute, colloidal particle or suspended particle of significantly greater dimensions than that of the solvent in which it is dissolved is fractionated by being subjected to such pressures that the solvent is forced to flow through a selected membrane. Generally, the term "ultrafiltration" may be applied to pressure-activated separations involving dissolved molecules, colloidal-sized particles or the like. Preferably, the term is applied to separations involving feed streams containing species having a molecular weight on the order of about 10 times the dimensions of the solvent molecules.

Many advantages have been realized by the employment of this relatively new separatory technique, among which may be considered reduction in time required for effecting separation, efficiency in separation, the use of generally mild operating conditions and reduced operating costs, as compared to older techniques such as evaporation, chemical precipitation, ultracentrifugation and the capability to separate species heretofore considered inseparable.

The advantages, such as mild operating conditions, are particularly important when thermally unstable or biologically active materials are to be processed.

In the employment of pressure-activated membrane separation processes, the success of operation depends, to a major degree, upon the characteristics of the membrane employed. Among the characteristics of membranes found to be desirable are:

(a) good hydraulic permeability to solvent, with the capability of transmitting liquid at high rates per unit membrane area under acceptable pressures;

(b) good mechanical durability with respect to thermal, pressure and chemical conditions of service;

(c) high fouling resistance; and (d) capability to retain completely, or almost completely, solutes, suspended matter or colloidal particles of a molecular weight or size above a specified value.

Membranes generally finding utility in ultrafiltration techniques presently employed in the art may be classified as either (a) homogeneous, or (b) anisotropic membranes.

Homogeneous membranes have a limited utility in separatory procedures, being analogous to conventionaL filters and being non-rententive for species other than those of suspended matter or of high molecular weight. Modification of such membranes to retain correspondingly smaller molecules generally results in a corresponding decrease in permeability. Additionally, such membranes are susceptible to internal fouling by the retained species.

A form of membrane particularly desirable in separation of solutes, suspended matter or colloidal particles is the submicroscopically porous anisotropic membrane having a thin skin and an underlying supporting sponge-like backing. The skin surface of the anisotropic membrane is exceedingly thin, e.g., from about 0.1 to about 1.0 microns thickness and having an average pore diameter in the sub-micron range, for example, from about 1 to 50 millimicrons. The balance of the membrane structure is a support layer comprised of a more porous polymer structure through which fluid can pass with little or no hydrodynamic resistance. When such a membrane is employed as a "molecular filter" with the "skin side" in contact with fluid under pressure, virtually all resistance to fluid flow through the membrane occurs in the "skin" and molecules or particles having dimensions larger than the pores of the "skin" are selectively retained. Because the skin layer is of such exceptional thinness, and because the transition from the skin layer to the macroporous support layer is so abrupt, the overall hydrodynamic resistance to fluid flow through the membrane is very low and the tendency of such membranes to become internally plugged or fouled by molecules or particles is greatly reduced.

The membranes may be of various configurations such as hollow fiber, flat sheet, spiral wound sheet or tubular. Preferably, for the purposes of the present invention, hollow fiber membranes are employed.

In ultrafiltration systems now in use, the pressures which are used to produce the tangential flow of feed stream over the membrane has been limited to a low value or values, the exact pressures being governed by the nature of the membranes in resisting rupture or collapse due to applied pressure. Generally, inlet pressures are limited to about 15 to 100 psig depending on membrane configuration. Such limitations often serve to render the separatory apparatus employed in solution separation less than fully economically desirable. Ultrafiltration units or cartridges are limited in length, on the order of from about one to about four feet, due to pressure limitations, the combined positive concentrate takeoff pressure and pressure drop across the cartridge being less than the maximum pressure which can be withstood by the membrane employed. Such restrictions on the inlet pressures seriously limit the capacity of the systems to efficiently process working solutions. In order to achieve a given large rate of separation, multiple ultrafiltration cartridges must be employed in a parallel configuration. However, such an assembly results in excessively large capital and operating costs.

SUMMARY OF THE INVENTION

It is an object of the present invention to provide an ultrafiltration assembly and a process for using same whereby the operating range over which the ultrafiltration membrane can effectively function is increased significantly and whereby the equipment and/or energy requirements associated with such systems are drastically reduced.

Other objects of the invention will be obvious to those skilled in the art on reading the following disclosure.

DETAILED DESCRIPTION OF THE INVENTION

In accordance with the present invention, the aforesaid objects have been achieved by connecting multiple, ultrafiltration membrane-containing pressure-resistant cartridges in a series relationship, introducing a feed stream to be separated into the system at a pressure exceeding the normal maximum allowable transmembrane pressure difference for the particular membrane selected, simultaneously applying a back pressure on the permeate side of the membrane in each cartridge where the inlet pressure exceeds the normal allowable maximum transmembrane pressure difference for the particular membrane employed. The advantages gained by such a system will become apparent hereinafter.

As used herein, the term "permeate" refers to that stream passing through the membrane surface, while the term "concentrate" defines that portion of the stream exiting the filter containing retained, non-permeating species.

The operation of a cartridge or unit containing an ultrafiltration membrane can generally be described in terms of two pressure differences, the hydrodynamic pressure difference ($\Delta PHYD$) and the transmembrane pressure difference ($\Delta PTM$).

The hydrodynamic pressure difference is the driving force required to move the process fluid in tangential flow across the membrane surface, and is calculated as the difference in process side pressure at the inlet and outlet of the cartridge as $$\Delta PHYD = P_1 - P_2$$

where $P_1$ is the inlet pressure and $P_2$ the pressure at the outlet. The hydrodynamic pressure difference establishes the velocity, v (ft/sec) of the process solution across the membrane surface in accordance with the well-known equations of fluid dynamics. This velocity is an important parameter in any ultrafiltration system, affecting both the permeation rate of the membrane and the rate of fouling, if any. For a given membrane and process fluid the process fluid velocity can be expressed, in general, as $$v = f(\Delta PHYD, T)$$

where f is a generalized function and T is the process fluid temperature. Thus, if the temperature T is held constant, the velocity of the process fluid is seen to be a simple function of the hydrodynamic pressure difference, not the absolute applied pressure.

The transmembrane pressure difference ($\Delta PTM$) is the driving force for permeation, calculated as the difference in pressure across the active membrane surface. This pressure difference varies along the membrane surface in accordance with the hydrodynamic pressure, or if $P_x$ is defined as the process side pressure at a given point and $P_3$ is the pressure on the permeate side of the membrane, the transmembrane pressure difference is expressed as $\Delta PTM = P_x - P_3$. It is to be noted that the lowest transmembrane pressure difference occurs at the outlet and the highest transmembrane pressure difference always occurs at the inlet of the cartridge.

The performance of all ultrafiltration membranes is generally limited by the maximum transmembrane pressure difference that the membrane will tolerate in continuous usage for long periods without rupture. The term does not mean that such membranes may not be operated for brief periods of time or cyclically at higher pressures. This is particularly true in the case of hollow fiber membranes which are supported and hence have a relatively low maximum $\Delta PTM$, generally on the order of from about 15 to about 50 psig. Thus, in previously employed systems where the pressure on the permeate side of the membrane was normally zero, the maximum allowable inlet or process side pressure has been equal to the maximum allowable transmembrane pressure difference ($\Delta PTM$ MAX = $P_1$).

BRIEF DESCRIPTION OF THE DRAWINGS

FIGS. 1-5 serve to illustrate the differences between the performances of prior art parallel separatory systems and the present system and to illustrate further the advantages accruing to the present invention.

FIG. 1 represents a single membrane cartridge having a maximum transmembrane pressure difference of 25 psig operating at an inlet pressure of 25 psig and an outlet pressure of 10 psig ($\Delta PHYD = 15$ psig) which results in a flow rate of Q gpm and a permeate rate of p gpm. Under standard conditions, if the separation required a production rate of 2 p gpm of permeate, two cartridges in parallel would be necessary (FIG. 2) with both cartridges operating under the same conditions as the single cartridge of FIG. 1.

Figure 3:
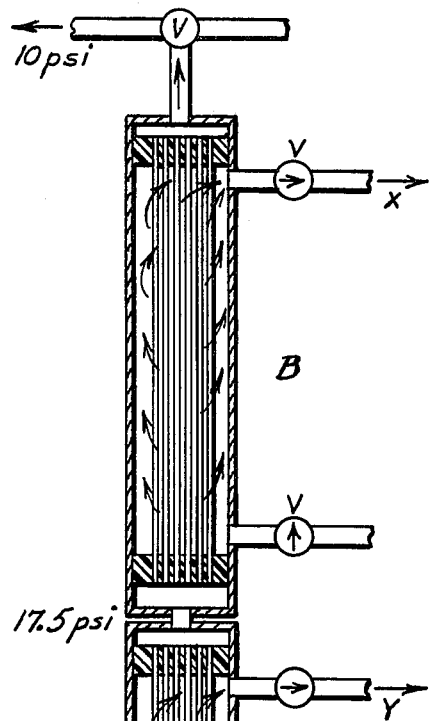

Coupling the two cartridges in a series arrangement, and maintaining the inlet pressure at 25 psig in the initial series cartridge (as shown in FIG. 3), would not result in a permeate production rate of 2 p gpm due to the reduced flow rate of the process stream adjacent the membrane surface, the flow rate of the process stream through the series-coupled cartridges being approximately one-half of that of the two parallel-arranged cartridges for the same $\Delta P$. Also, equal performance could not be obtained by increasing the inlet pressure above the 25 psig level, as it would serve to require that the transmembrane pressure difference at the cartridge inlet exceed the maximum $\Delta PTM$ allowable for the selected membrane.

FIGS. 4 and 5 depict the inventive concept of the present application wherein multiple cartridges are connected in series, the inlet pressure to the system significantly exceeds the maximum allowable pressure for the membrane, and wherein the permeate side of each cartridge having a $\Delta PTM$ exceeding the maximum $\Delta PTM$ specified is back pressured independently to the extent necessary to produce a $\Delta PTM$ within the cartridge not exceeding the maximum $\Delta$ specified for the particular membrane employed.

Figure 1:
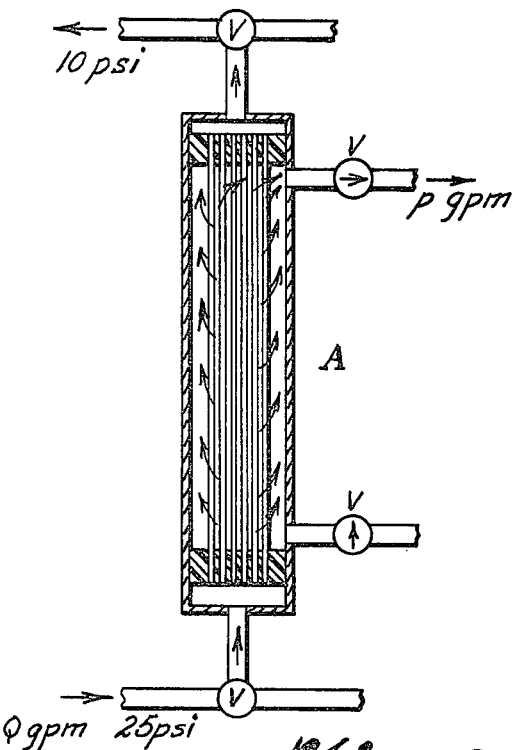

As shown in FIG. 4, in order to duplicate the flow velocity Q of FIG. 1, the inlet pressure is increased to 40 psig and a back pressure regulator employed on the permeate side of cartridge B to maintain a constant pressure of 15 psig on the permeate side. The application of the 15 psig back pressure on the permeate side of cartridge B serves to reduce the $\Delta PTM$ at the inlet an acceptable 25 psig. With a pressure drop ($\Delta PHYD$) of 15 psig across the process side of the membrane the inlet pressure of cartridge A is 25 psig, requiring no back pressure on the permeate side of the membrane. The net effect of such process is to double the permeating capacity of the system for a given process flow rate Q. This improved permeate capacity to process fluid flow rate ratio results in smaller system sizing and hence reduced capital costs making a heretofore expensive separating technique economically attractive. While the use of higher pressures may at first appear disadvantageous, such a disadvantage is more than offset by the following capacity advantages realized.

Horsepower requirements to conduct the processes depicted by FIGS. 1-5 are calculated as $$hp = \frac{(flow)(pressure)}{1714}$$

Figure 2:
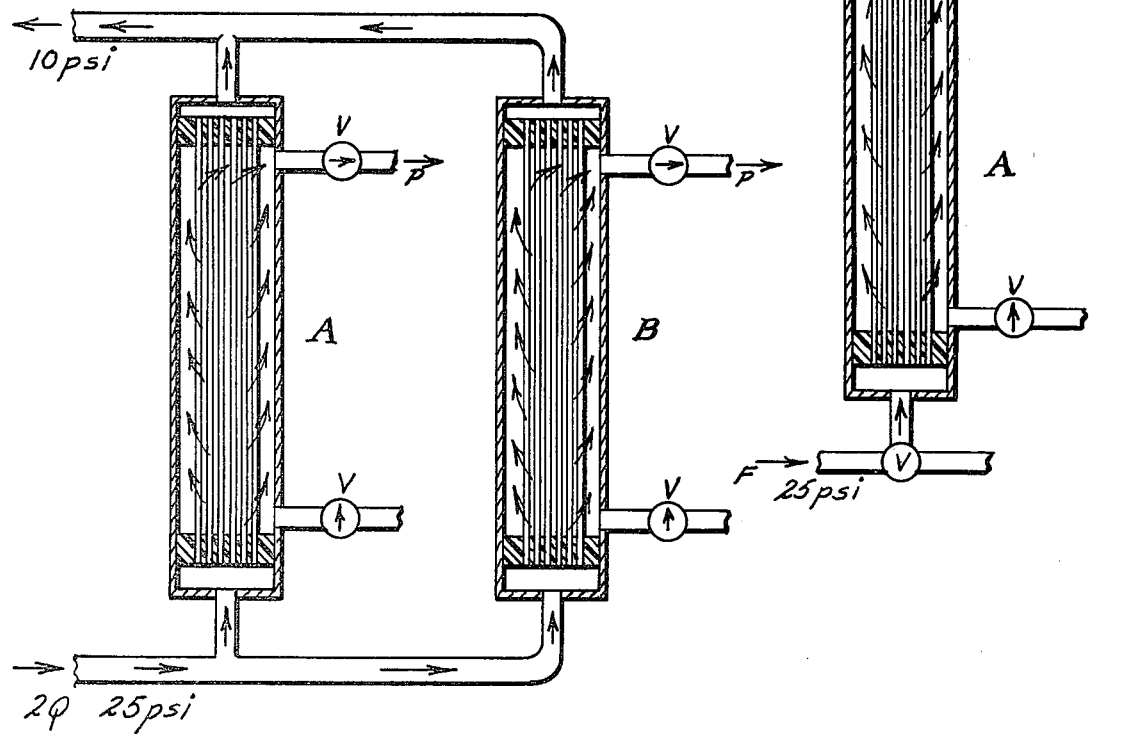

In comparing the energy requirements for the parallel and seris connected pressurized arrangements, where yield of permeate is 2 p as in FIGS. 2 and 4:

$$\text{Parallel hp} = \frac{(2Q)(25)}{1714} = 0.0292Q \quad (1)$$

$$\text{Pressurized permeate series hp} = \frac{(Q)(40)}{1714} = 0.0233Q \quad (2)$$

As is evident, the pressurized permeate series configuration, while requiring a higher initial inlet pressure, consumes much less energy, exhibiting a 20.2% decrease in energy requirements. In terms of performance utilizing permeate rate p as a criteria, per hp energy required in the systems, the comparison in efficiency is shown as $$\text{Parallel} = \frac{\text{capacity}}{\text{hp}} = \frac{2p}{0.0292Q} = 68.5 \, p/Q \quad (1)$$

$$\text{Pressurized permeate Series} = \frac{\text{capacity}}{\text{hp}} = \frac{2p}{0.0233Q} = 85.8 \, p/Q \quad (2)$$

Thus, the pressurized permeate series configuration serves to be 25.3% more effective and to deliver 25.3% more capacity for a given energy input.

Applying the pressurized permeate series concept to more than two cartridges with independent regulation of permeate back pressure in each cartridge, excluding the last series cartridge, as shown in FIG. 5, produces performance values higher than those obtained in the two-cartridge pressurized series. In the process run depicted by FIG. 5, an initial inlet pressure of 55 psig was used in cartridge C with a back pressure of 30 psig, and in cartridge B a back pressure of 15 psig was applied against the inlet pressure of 40 psig. As can be appreciated from the following, the efficiency of this system, based on 3 p output, represents a significant advance over the performance of a three-cartridge parallel arrangement.

$$\text{Parallel hp} = \frac{(3Q)(25)}{1714} = 0.0438Q \quad 1.$$

$$\text{Pressurized permeate series hp} = \frac{(Q)(55)}{1714} = 0.0321Q$$

$$\text{Parallel} \frac{\text{capacity}}{\text{hp}} = \frac{3p}{0.0438Q} = 68.5 \, p/Q \quad 2.$$

$$\text{Pressurized permeate series} \frac{\text{capacity}}{\text{hp}} = \frac{3p}{0.0321Q} = 93.5 \, p/Q$$

The three-cartridge pressurized permeate series configuration thus exhibits a 36.5% increase in efficiency when measured on the basis of capacity/hp.

The pressurized permeate series arrangement and process of the present invention may be used with any of the various membrane cartridges currently available, including hollow fiber, spiral wound, and tubular types.

The anisotropic membranes used in the cartridges may be made from a wide selection of synthetic polymeric materials, particularly those of low water adsorptivity. Such polymers which may be employed include polycarbonates, polyamides, halogenated polymers such as polyvinylidene fluoride, polychloroethers, polyacetals, polyacrylics, polyurethanes, polyimides, polyvinylacetate, polyethers and the like.

In establishing the pressurized permeate series-connected multicartridge system of the present invention, the selected membranes are housed in suitable pressure-resistant cartridges equipped with suitable inlet means, concentrate takeoff means, permeate takeoff means, a means for providing a predetermined back pressure on the permeate side of the membrane and means for coupling the selected number of cartridges in series. As has been stated, the final cartridge in the series may not require a means for producing a back pressure.

While it is possible to provide a series arrangement containing from 2 to about 8 cartridges, it is generally preferred to limit the number of cartridges in the system to from 2 to 3.

The economic significance of the pressurized permeate series arrangement is shown by the following comparison data, developed through utilization of the standard manifold diameters available for ultrafiltration processors and comparison with conventional parallel configurations for identical permeate production rates.

Cost comparisons for a 148 cartridge system illustrate dramatically the economic advantages accruing to the pressurized permeate series system.

| Manifold Diameter Inches | Approximate Cost Parallel Systems, $ | # of Cartridges Pressurized Permeate Sys. | Approximate Cost Pressurized Permeate Sys., $ | Cost Sav. $ | Cost Red. % |
|---|---|---|---|---|---|
| 4 | 199,300 | 3 | 93,400 | 105,900 | 53.0 |
| 6 | 125,300 | 2 | 78,500 | 46,800 | 37.4 |
| 8 | 86,400 | 2 | 53,100 | 33,300 | 38.5 |

The following example serves to illustrate the present invention.

EXAMPLE I

Electrophoretic Paint

In an apparatus as shown in FIG. 4, approximately 22 gpm of PPG No. 3002H cathodic electrophoretic paint was subjected in a series of tests to ultrafiltration utilizing two HF 26.5-43-CXM cartridges, available from Romicon, Inc. of 100 Cummings Park, Woburn, Mass. 01801. The results of these tests are as follows.

| Test No. | Cartridge Identi. | Pressure Profile, inlet/outlet/ Permeate, psig | ΔPTM psig | ΔPHYD psig | Flux, gsfd |
|---|---|---|---|---|---|
| 1 | B | 56/30/25 | 18.0 | 26.0 | 22.3 |
|   | A | 30/6/0 | 18.0 | 24.0 | 21.2 |
| 2 | B | 30/6/0 | 18.0 | 24.0 | 20.2 |
|   | A | 56/30/25 | 18.0 | 26.0 | 23.8 |
| 3 | B | 56/30/25 | 18.0 | 26.0 | 21.6 |
|   | A | 30/7/0 | 18.5 | 23.0 | 23.4 |
| 4 | B | 30.5/7/0 | 18.0 | 23.5 | 19.8 |
|   | A | 56/30.5/25 | 18.3 | 25.5 | 24.5 |
| 5 | B | 56/30/25 | 18.0 | 26.0 | 20.2 |
|   | A | 30/7/0 | 18.5 | 23.0 | 23.4 |
| 6 | B | 30/7/0 | 18.5 | 23.0 | 19.0 |
|   | A | 56/30/25 | 18.0 | 26.0 | 24.5 |

EXAMPLE 2

Cheese Whey

The protein content of whey produced from a cheddar cheese manufacturing plant is approximately 12% on a dry mass basis. A Romicon HF26.5-43-PM10 hollow fiber ultrafiltration membrane can readily increase the protein content of such whey to a 35% protein product by selectively concentrating the protein content of the whey and allowing low molecular weight sugars and ash to pass through the membrane. Such a membrane requires 204 HF26.5-43-PM10 cartridges to process 120,000 gallons of cheddar cheese whey to the 35% protein level during the course of a 20 hour day. The capital and energy cost reduction achieved with the pressurized permeate series configuration versus the standard parallel configuration for a plant sized at this capactiy is as follows:

|  | Parallel Configuration | Pressurized Permeate Series Configuration | Savings |
|---|---|---|---|
| Cartridges/Stage | 34 | 68 | — |
| Number of Stages | 6 | 3 | — |
| Rated Capacity, gpd | 126,040 | 116,940 | — |
| Approximate Cost, $ | 258,900 | 204,700 | 52,200 |
| Approximate Installed hp | 120 | 75 | 45 |

EXAMPLE 3

Cheese Whey

The advantages of the pressurized permeate technology cited in Example 2 are achieved for both large and small size systems as illustrated below for a 210,000 gpd system which requires 340 cartridges.

|  | Parallel Configuration | Pressurized Permeate Series Configuration | Savings |
|---|---|---|---|
| Cartridges/Stage | 34 | 68 | — |
| Number of Stages | 10 | 5 | — |
| Rated Capacity, gpd | 211,300 | 202,940 | — |
| Approximate Cost, $ | 431,500 | 341,200 | 90,300 |
| Approximate Installed, hp | 200 | 125 | 75 |

I claim:

1. A method for separating solutes, colloidal particles or suspended matter from a solution or suspension of such matter by ultrafiltration which comprises:
   (a) connecting multiple ultrafiltration membrane containing separatory units in series flow configuration, thereby providing, at least, a first unit, a last unit and optionally intermediate units;
   (b) introducing a solution or suspension to be separated into the first unit at a pressure exceeding the maximum allowable transmembrane pressure difference for said membrane;
   (c) concurrently applying a back pressure on the permeate side of said membrane to produce a transmembrane pressure difference in said first unit not exceeding the maximum allowable transmembrane pressure difference for said membrane;
   (d) repeating steps (b) and (c) in at least each intermediate unit;
   (e) withdrawing permeate from each unit; and
   (f) recovering concentrate containing solutes, colloidal particles or suspended matter from the last serially connected unit.

2. A method as defined by claim 1 wherein said membranes are hollow fiber membranes.

3. A method as defined by claim 2 wherein two units are connected in series.

4. A method as defined by claim 3 wherein an inlet pressure in the range of about 40 to 80 psig and a back pressure in the range of about 15 to 55 psig is applied to the initial unit in said series.

5. A method as defined by claim 3 wherein an inlet pressure of about 40 psig and a back pressure of about 15 psig is applied to the initial unit in said series.

6. A method as defined by claim 2 wherein three units are connected in series.

7. A method as defined by claim 6 wherein an inlet pressure of about 50 to 120 psig and a back pressure of about 25 to 95 psig is applied to the initial unit in said series, an inlet pressure of about 40 to 80 psig and a back pressure of about 15 to 55 psig is applied to the second unit in said series.

8. A method as defined by claim 6 wherein an inlet pressure of about 55 psig and a back pressure of about 30 psig is applied to the initial unit in said series, an inlet pressure of about 40 psig and a back pressure of about 15 psig is applied to the second unit in said series.

9. A method according to claim 1 wherein steps (b) and (c) are repeated in the last unit.

10. A method as defined by claim 1 wherein said membrane has an average porosity in the range of from about 1 to about 50 millimicrons.

11. An apparatus for conducting ultrafiltration which comprises:
    (a) multiple pressure-resistant filter cartridges containing ultrafiltration membranes, said cartridges connected in series flow configuration;
    (b) inlet means situate in each of said cartridges;
    (c) concentrate takeoff means in each cartridge;
    (d) permeate takeoff means in each cartridge;
    (e) means for introducing a solution or suspension to be separated into each but the last unit at a pressure exceeding the maximum allowable transmembrane pressure difference for each membrane;
    (f) means for concurrently providing back pressure on the permeate side of each but said last unit to produce a transmembrane pressure difference in each unit not exceeding the maximum allowable transmembrane pressure difference for said membrane; and
    (g) means for coupling said cartridges in said series.

12. An apparatus as defined by claim 11 wherein two cartridges are connected in series.

13. An apparatus as defined by claim 11 wherein three cartridges are connected in series.

14. The apparatus as defined in claim 11 including meanes to back pressure the last cartridge in said series.

* * * * *